(No Model.)
B. HAGER.
APPARATUS FOR DISINTEGRATING BITUMINOUS ROCK.
No. 493,357. Patented Mar. 14, 1893.
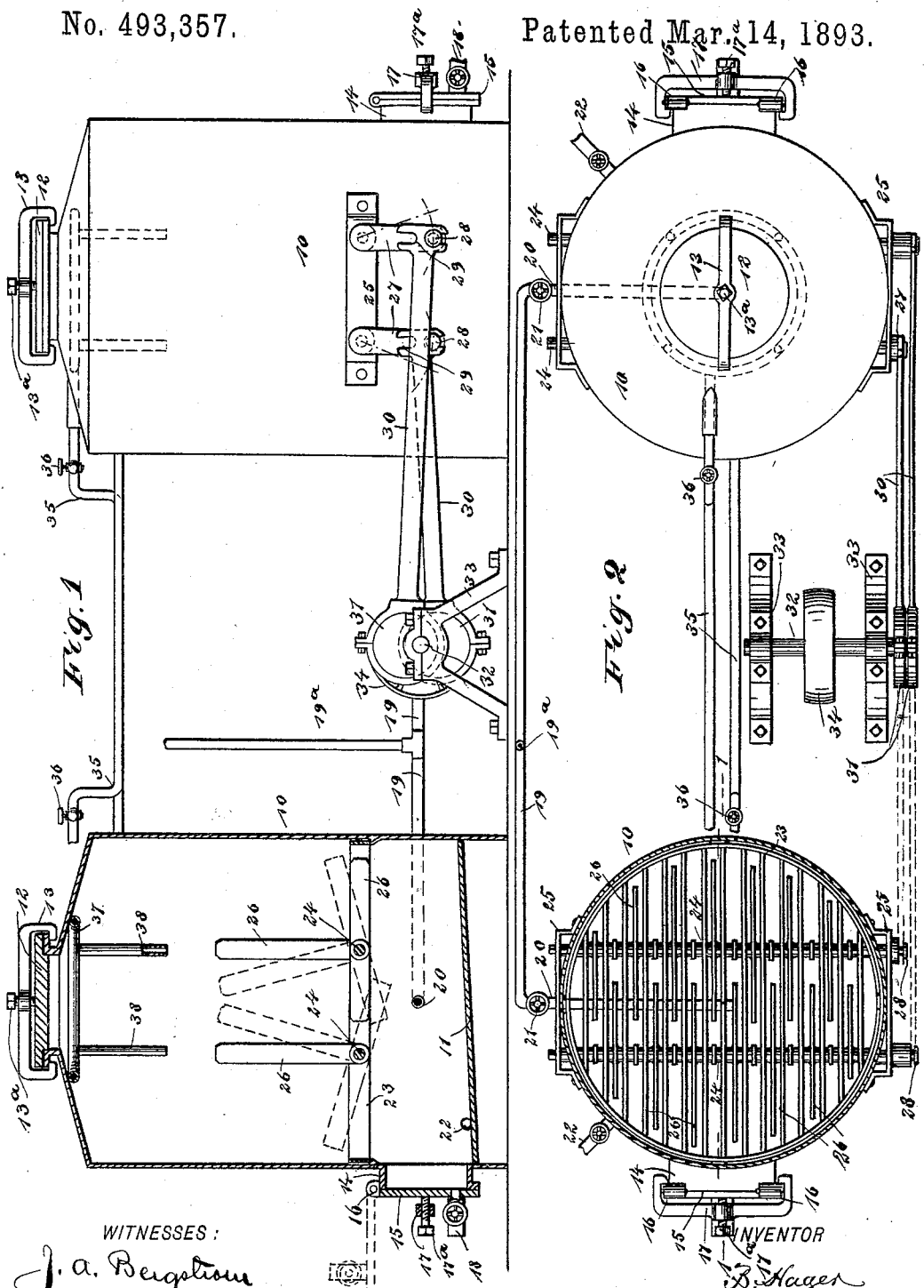
WITNESSES:
J. A. Bergstrom
C. Sedgwick
INVENTOR
B. Hager
BY Munn & Co.
ATTORNEYS.

UNITED STATES PATENT OFFICE.

BEN HAGER, OF SALT LAKE CITY, UTAH TERRITORY.

APPARATUS FOR DISINTEGRATING BITUMINOUS ROCK.

SPECIFICATION forming part of Letters Patent No. 493,357, dated March 14, 1893.

Application filed April 22, 1892. Serial No. 430,207. (No model.)

*To all whom it may concern:*

Be it known that I, BEN HAGER, of Salt Lake City, in the county of Salt Lake and Territory of Utah, have invented a new and Improved Apparatus for Disintegrating Bituminous Rock, of which the following is a full, clear, and exact description.

My invention relates to improvements in an apparatus for disintegrating bituminous rock, and especially what is known as rock or dry asphaltum. This material is readily disintegrated by the action of steam, and the object of my invention is to produce an apparatus by means of which a continuous disintegrating process may be carried on and by means of which the disintegrated material may be rapidly shaken down and conveniently delivered into a cart or other receptacle.

To this end my invention consists of an apparatus, the construction of which will be hereinafter described and claimed.

Reference is to be had to the accompanying drawings forming a part of this specification, in which similar figures of reference indicate corresponding parts in both the views.

Figure 1 is a broken side elevation of the apparatus with one of the kettles in section on the line 1—1 in Fig. 2; and Fig. 2 is a plan view of the apparatus with one of the kettles shown in horizontal section.

The apparatus is provided with two stationary kettles 10, and while one kettle embodies much of my invention, two are employed to the end that one or the other may be used constantly, and a continuous process of disintegration carried on, one being used while the other is being emptied. Each kettle 10 is provided with an inclined bottom 11, and with a top opening through which it is filled, this opening being closed when the kettle is in use by a cover 12, which is held in place by a clamping piece 13 and screw 13ª, the cover and fastener being substantially like the ordinary manhole cover and fastener. At the lower end of the kettle and on the front side is an outlet 14, through which the disintegrated material is taken, this being kept closed by an upwardly-swinging lid 15, which is hinged at its upper edge, as shown at 16, and the lid is fastened by a clamping piece 17 and screw 17ª, substantially like the cover and fastener 13 and 13ª already described.

The lid has an outlet pipe 18, opening through it, which pipe is controlled by a gate valve and usually the disintegrated and semi-liquid material is blown out through the pipe 18, and into the cart or other receptacle, which conveys it away for use; but in case the valve does not work for any reason, the lid may be swung upward and the material shoveled out through the opening 14.

The steam is supplied to the kettles through a pipe 19, which has connection with the main supply pipe 19ª, and which opens into the lower portion of the kettles, as shown at 20, the pipe having a cock 21, near each end, so that the steam may be let into either kettle, as described. The kettles are also each provided with a water outlet pipe 22, which opens from the lower portion of the kettle and is controlled by a suitable cock.

Above the outlet 14 in each kettle, is a stationary grate 23, and extending transversely through the kettle and held to turn in the grate bars are rock shafts 24, the outer ends of which are journaled in brackets 25, on the kettle, and the shafts are provided with grate bars 26, which are held at right angles to each other, and which are adapted to oscillate between the bars of the stationary grate 23. The object of this mechanism is to force the disintegrated asphaltum down through the stationary grate and into the bottom portion of the kettle.

The rock shafts 24 are provided at one end with cranks 27 which have crank pins 28 at their free ends, these being adapted to enter the slots 29, in the free ends of the eccentric rods 30 which rods are reciprocated by means of the eccentrics 31 on the driving shaft 32, this shaft being journaled in supports 33 midway between the two kettles and provided with a driving pulley 34.

Opening from the upper part of each kettle is a steam pipe 35 controlled by a cock 36, and these pipes deliver into circular pipes 37 held to the upper wall of the kettles, and the pipes 37 have depending outlet pipes 38 adapted to deliver into the kettle. The object of this arrangement is to save steam. For instance, when the disintegrating process in one kettle is completed, there will be, say sixty pounds of steam in the kettle, and by opening the pipe 35, leading to the other kettle, the steam may be allowed to blow off into the second kettle and be utilized for disintegrating the material therein. It is essential that this connection be made at the upper portions of the kettle, as the steam condenses rapidly in the kettles and the condensed water which accumulates in the bottoms of the kettles prevents efficient connection being made between the lower parts of the kettles.

The operation of the apparatus is as follows: One of the kettles is filled or partially filled with the crude or coarse asphaltum which consists of a mixture of asphaltum and sand, the cover 13 is fastened in place, the eccentric rods 30 are connected with the cranks 27 of the kettle, the steam turned on through the pipe 19ª and the driving shaft started. As the steam enters it rises through the asphaltum, thus rapidly disintegrating it, and the oscillation of the grate bars 26 forces the material downward into the bottom of the kettle, from whence it may be withdrawn through the pipe 18 or outlet 14 into a cart. When the process is completed in one kettle, the eccentric rods 30 are tipped over so as to connect with the cranks of the opposite kettle, and as this kettle has been filled, while the process was carried on in the other kettle, a continuous and rapid reduction or disintegration of the material may be maintained.

It will be noticed that the connection with the crank shafts of each kettle may be easily made, as the driving shaft is midway between the kettles and the eccentric rods may be tipped over, as shown by dotted lines in Fig. 2, and connected with the cranks of either kettle.

Having thus fully described my invention, I claim as new and desire to secure by Letters Patent—

1. An apparatus of the character described, comprising a kettle having an inlet and outlet, a stationary grate extending transversely across the kettle, and oscillating grate bars comprising bars projecting at right angles to each other and adapted to swing between the bars of the stationary grate, substantially as shown and described.

2. An apparatus of the character described, comprising a pair of kettles having suitable inlets and outlets, stationary grates arranged within the kettles, oscillating grate bars held to move between the stationary grate bars, a steam supply for the kettles, and a steam pipe connection between the two kettles, substantially as described.

3. The combination of the two kettles having disintegrating mechanism therein, and a suitable steam supply, steam pipes held in the upper portion of the kettles, and provided with depending delivery pipes, and a pipe leading from the upper part of each kettle to connect with the top pipe of the adjacent kettle, substantially as described.

4. In an apparatus of the character described, the kettle having an inlet at the top, an outlet at the bottom, an inclined bottom, a stationary grate held horizontally therein, oscillating grate bars held to swing between the bars of the stationary grate, a steam pipe adapted to deliver beneath the grate, and a second pipe held to deliver above the grate, substantially as described.

5. The combination of the two kettles, their oscillating crank shafts having grate bars thereon, the driving shaft arranged midway between the kettles, and the swinging eccentric rods driven by the shaft and having their ends adapted to engage the cranks of the crank shafts, substantially as described.

BEN HAGER.

Witnesses:
WARREN B. HUTCHINSON,
C. SEDGWICK.